(12) United States Patent
Bedapudi

(10) Patent No.: US 6,912,848 B2
(45) Date of Patent: Jul. 5, 2005

(54) PARTICULATE FILTER AFTERTREATMENT OF DIESEL ENGINE EXHAUST

(75) Inventor: Prakash Bedapudi, Tyler, TX (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 10/638,102

(22) Filed: Aug. 7, 2003

(65) Prior Publication Data

US 2004/0103645 A1 Jun. 3, 2004

Related U.S. Application Data

(60) Provisional application No. 60/402,391, filed on Aug. 9, 2002.

(51) Int. Cl.⁷ ................................................. F01N 3/00
(52) U.S. Cl. ............................. 60/297; 60/274; 60/280; 60/295; 60/303; 180/65.2; 180/65.3; 180/65.5
(58) Field of Search .......................... 60/280, 286, 295, 60/297, 300, 303, 311, 274; 180/65.1, 65.2, 65.3, 65.5

(56) References Cited

U.S. PATENT DOCUMENTS

| | | | |
|---|---|---|---|
| 4,489,242 A | * | 12/1984 | Worst ........................ 307/10.1 |
| 4,774,811 A | | 10/1988 | Kawamura |
| 5,319,930 A | * | 6/1994 | Shinzawa et al. ............. 60/286 |
| 5,323,868 A | * | 6/1994 | Kawashima ................ 180/65.4 |
| 6,038,854 A | | 3/2000 | Penetrante et al. |
| 6,422,001 B1 | * | 7/2002 | Sherman et al. ............. 60/274 |
| 6,438,948 B2 | * | 8/2002 | Ono et al. .................... 60/311 |
| 6,758,037 B2 | * | 7/2004 | Terada et al. ................ 60/295 |

* cited by examiner

Primary Examiner—Binh Q. Tran
(74) Attorney, Agent, or Firm—Gerald W. Spinks

(57) ABSTRACT

A system for aftertreatment of diesel engine exhaust on a vehicle which is equipped for dynamic braking, using the electrical power generated by the dynamic braking to energize a resistor bank which incinerates particulate matter which has been collected in a particulate matter filter, thereby regenerating the filter.

2 Claims, 1 Drawing Sheet

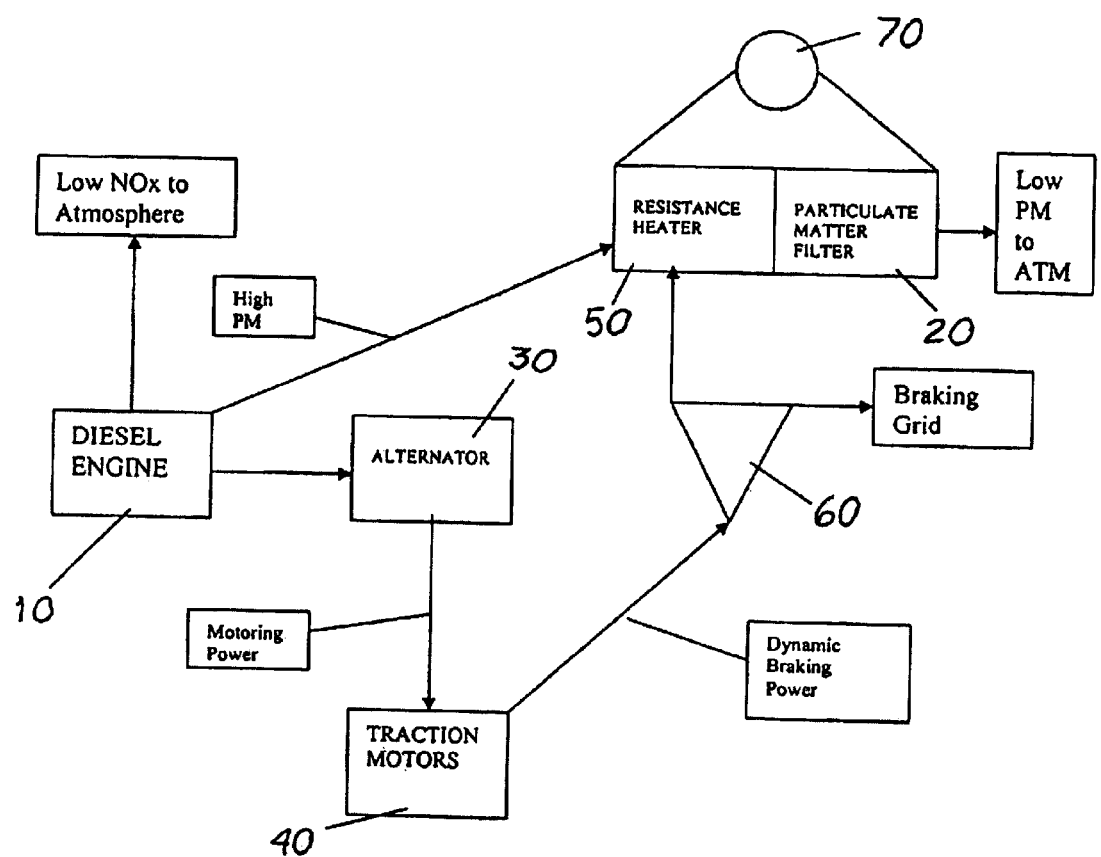

PARTICULATE FILTER AFTERTREATMENT OF DIESEL ENGINE EXHAUST

CROSS REFERENCE TO RELATED APPLICATIONS

This application claims the benefit of the filing date of U.S. Provisional App. No. 60/402,391, filed Aug. 9, 2002, for "Particulate Filter Aftertreatment of Diesel Engine Exhaust".

STATEMENT REGARDING FEDERALLY SPONSORED RESEARCH OR DEVELOPMENT

Not Applicable

BACKGROUND OF THE INVENTION

1. Field of the Invention

This invention is in the field of methods and equipment used to reduce the emission of pollutants from diesel engines, particlarly to reduce the emission of particulate matter.

2. Background Art

In a diesel engine, liquid fuel is injected into the cylinders, which are full of compressed air at high temperature. The fuel is broken into droplets, which evaporate and mix with the air in the cylinder to form a flammable mixture. The timing of combustion is controlled by the timing of fuel injection. Major concerns include maximizing fuel efficiency, and minimizing the emission of nitrogen oxides and particulate matter.

The generation of some exhaust emissions, including particulate matter, is related to the ending time of the fuel injection interval. Generally, the earlier the fuel injection ending time, the less particulate matter is generated during the combustion cycle. So, in some diesel engines, fuel injection is timed early in the cycle to achieve full load smokeless operation, with reduced emission of particulate matter. However, early fuel injection timing increases engine cycle temperature, which results in a relatively high rate of emission of nitrogen oxides.

Conversely, one of the most effective ways to reduce NOx emissions is to retard the starting time of fuel injection. Unfortunately, the associated retardation of the fuel injection ending time causes untimely and incomplete combustion of the fuel, which, among other things, increases the emission of particulate matter. It is possible to retard the fuel injection starting time to reduce NOx emissions, while simultaneaously shortening the fuel injection duration to advance the fuel injection ending time, thereby reducing the emission of particulate matter. However, this approach increases fuel consumption. Another approach to reducing NOx emissions is to employ exhaust gas recirculation, but this also tends to increase the amount of smoke and particulate matter in the exhaust. Still another approach is to reduce NOx in the exhaust gas by after-treatment of the exhaust gas with selective catalytic reduction devices using a urea solution. However, such devices require significant changes to the structure of the vehicle to enable carrying of the urea solution, and they can result in a 3 or 4 percent reduction in fuel efficiency.

Further, when diesel engines are operated at higher altitudes, less air is introduced into the cylinders, causing the mixing of fuel and air to be less complete. This contributes to late and incomplete combustion, which increases the emission of particulate matter and smoke. Independent reduction of particulate matter in the exhaust can be achieved by particulate filters which are periodically regenerated by burning off the collected particulate matter with diesel fuel. However, this can also result in consumption of 3 or 4 percent of the fuel flow.

It would be advantageous to have a system for reducing the emission of particulate matter in diesel engine exhaust, without detracting from other means which may be employed for the reduction of NOx or other pollutants.

BRIEF SUMMARY OF THE INVENTION

The present invention is a method and apparatus for after-treatment of the exhaust stream from a vehicle's diesel engine to remove particulate matter, by first collecting particulate matter in a filter, then burning the particulate matter to remove it from the filter. The combustion products from burning of the collected particulate matter are released to the atmosphere with a substantial reduction in the amount of entrained particulate matter. Heat to burn the collected particulate matter out of the filter, thereby regenerating the filter, is produced by an electric resistance heater powered by the vehicle's traction motors during dynamic braking of the vehicle.

The novel features of this invention, as well as the invention itself, will be best understood from the attached drawings, taken along with the following description, in which similar reference characters refer to similar parts, and in which:

BRIEF DESCRIPTION OF THE SEVERAL VIEWS OF THE DRAWINGS

The FIGURE is a schematic diagram of the system of the present invention.

DETAILED DESCRIPTION OF THE INVENTION

The system of the present invention can be used, for example, on a vehicle with a diesel engine in which NOx emissions are being reduced by a combination of retarded fuel injection timing, lowered manifold air temperature, and internal exhaust gas recirculation. Use of some combination of these methods would eliminate any need for after-treatment of the exhaust gas for NOx reduction, such as with lean NOx catalyst or selective catalytic reduction systems. However, a high rate of particulate matter formation will result.

As shown in the FIGURE, exhaust gas from the diesel engine 10 is routed through one or more diesel particulate matter filters (DPF) 20, where at least a substantial portion of the particulate matter is removed from the exhaust gas stream and collected in the DPF filter 20. The effluent from this DPF filter 20 is exhaust gas with significantly reduced particulate matter entrainment.

As is well known in the art, in a vehicle such as a locomotive, the diesel engine 10 is commonly used to drive an alternator 30, which, in turn, provides current to drive one or more traction motors 40, in the motoring mode. As is also well known in the art, such vehicles commonly use dynamic braking to slow or stop the vehicle. In the dynamic braking mode, the momentum of the vehicle turns the wheels, which turn the traction motors 40. Turning of the traction motors 40 is resisted by placing them in the braking mode, thereby causing the traction motors 40 to produce electrical power. In the prior art, the power produced by the traction motors 40 during dynamic braking is commonly dissipated by resistor grids (not shown) electrically connected to the traction motors 40. These resistor grids convert the electrical power produced by the traction motors 40 to heat, which is commonly dissipated to the atmosphere by ambient air passing over the resistor grids.

In the present invention, as seen in the FIGURE, at least a portion of the electrical power produced by the traction motors 40 during dynamic braking is applied to one or more electric resistance heaters 50, which in turn heat the particulate filter 20. The resistance heaters 50 are appropriately sized and located to raise the temperature of the particulate matter collected in the particulate filter 20 to a temperature sufficiently high to cause combustion of the particulate matter. This substantially converts the collected particulate matter to gaseous combustion products, which exit the particulate filter 20 along with the effluent exhaust gas stream.

The resistance heaters 50 can be incorporated into the particulate filter 20 in such a way as to be in direct contact with the structure of the filter medium, so as to apply heat to the collected particulate matter by means of conduction, or by a combination of conduction, convection, and radiation. Alternatively, the resistance heaters 50 can be located in the exhaust gas stream upstream of the particulate filter 20. With this arrangement, the resistance heaters 50 can apply heat to raise the temperature of the influent exhaust gas on the upstream side of the filter 20 to a sufficiently high temperature to cause combustion of the particulate matter which has been collected in the filter 20.

When in the motoring mode, no dynamic braking power is available for regeneration of the particulate filter 20, so the filter 20 is sized to collect a sufficient amount of particulate matter between anticipated regeneration cycles to avoid causing undue backpressure in the exhaust gas stream. The expected rate of production of particulate matter, the expected time between dynamic braking cycles, and the expected duration of braking cycles are all taken into account in sizing the particulate filter 20 and the resistance heaters 50 used for regeneration of the filter 20.

The level of power applied to the particulate filter regenerative heaters 50 can be controlled by means well known in the art, with any excess or remaining power being dissipated in the dynamic braking grid, similar to the method for dissipation of braking power known in the prior art. This apportionment of the dissipation of dynamic braking power can be accomplished by load sharing or switching devices 60, as is well known in the art. The extent of particulate loading of the filter 20 can be sensed by a device such as a pressure differential sensor 70, as is known in the art, and the ouput of the sensor 70 can be used to control the load sharing device 60 to apportion or switch the dynamic braking power between the filter 20 and the braking grid.

While the particular invention as herein shown and disclosed in detail is fully capable of obtaining the objects and providing the advantages hereinbefore stated, it is to be understood that this disclosure is merely illustrative of the presently preferred embodiments of the invention and that no limitations are intended other than as described in the appended claims.

I claim:

1. A system for reducing NOx and particulate emissions from engine exhaust from a railroad locomotive diesel engine, while maintaining fuel efficiency, comprising:

a diesel engine on a railroad locomotive having a fuel injection system, an air intake manifold and an internal exhaust gas recirculation system, with engine operations being set to retard fuel injection timing to a point later than a standard setting, the manifold air temperature being maintained at a temperature lower than a standard temperature and with exhaust gas being recirculated to the intake manifold, to reduce the generation of NOx while maintaining fuel efficiency, but with a resultant increase in the generation of particulate emissions in the engine exhaust;

a filter mounted on said locomotive to receive an exhaust stream from said diesel engine, said filter being adapted to collect said particulate matter from said locomotive diesel engine exhaust stream;

an electrical resistance heater adapted to apply heat to said particulate filter to burn said collected particulate matter and thereby remove said particulate matter from said filter;

a regenerative braking system on said locomotive, said regenerative braking system being connected to supply electric power to said resistance heater;

an electric power controller on said locomotive for directing electric power generated upon regenerative braking to said filter heater to burn particulate matter collected in said filter and directing any remaining regenerative electrical power generated to another power use device on said locomotive; and a sensor associated with said filter generating a signal transmitted to said power controller indicative of an operating condition of said filter.

2. A method for lowering NOx and particulate emissions in engine exhaust from a railroad locomotive diesel engine having fuel injection, an air intake manifold and an internal exhaust gas recirculation system, while maintaining fuel efficiency, comprising:

operating a railroad locomotive diesel engine with fuel injection timing retarded to a point later than a standard setting, with manifold air temperature at a temperature lower than a standard temperature, and with exhaust gas being recirculated to the intake manifold, to achieve reduced NOx emission in the exhaust stream wherein said operations for reduced NOx emission also result in an increase in the generation of particulate emissions in the engine exhaust;

routing said exhaust stream through a filter, said filter collecting particulate matter from said locomotive diesel engine exhaust stream;

applying heat to said particulate filter with an electrical resistance heater to burn said collected particulate matter and thereby remove said particulate matter from said filter;

supplying electric power to said resistance heater with a regenerative braking system on said locomotive;

directing electric power generated upon regenerative braking to said filter heater to burn particulate matter collected in said filter and directing any remaining regenerative electrical power generated to another power use device on said locomotive, with a power controller; and generating a signal with a sensor associated with said filter, said signal being indicative of an operating condition of said filter, and transmitting said signal to said power controller.

* * * * *